(12) United States Patent
van Rensburg et al.

(10) Patent No.: US 8,194,602 B2
(45) Date of Patent: Jun. 5, 2012

(54) SYSTEM AND METHOD FOR DOWNLINK CONTROL SIGNAL STRUCTURE FOR MULTI-USER MIMO

(75) Inventors: Cornelius van Rensburg, Wylie, TX (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 604 days.

(21) Appl. No.: 12/407,716

(22) Filed: Mar. 19, 2009

(65) Prior Publication Data
US 2009/0247175 A1    Oct. 1, 2009

Related U.S. Application Data

(60) Provisional application No. 61/037,975, filed on Mar. 19, 2008.

(51) Int. Cl.
*H04W 4/00*    (2009.01)
*H04B 15/00*    (2006.01)

(52) U.S. Cl. ........................................ 370/329; 370/341
(58) Field of Classification Search .................. None
See application file for complete search history.

(56) References Cited

U.S. PATENT DOCUMENTS

| | | | |
|---|---|---|---|
| 7,649,831 B2 * | 1/2010 | Van Rensburg et al. | 370/203 |
| 7,941,186 B2 * | 5/2011 | Cho et al. | 455/561 |
| 8,050,609 B2 * | 11/2011 | Kobayashi et al. | 399/328 |
| 8,073,069 B2 * | 12/2011 | Mundarath et al. | 375/267 |
| 2007/0254652 A1 | 11/2007 | Khan et al. | |
| 2007/0280116 A1 * | 12/2007 | Wang et al. | 370/236 |
| 2009/0298482 A1 * | 12/2009 | Yen et al. | 455/414.2 |

OTHER PUBLICATIONS

Zhu, J., et al., "Efficient CQI Update Scheme for Codebook Based MU-MIMO with Single CQI Feedback in E-UTRA," Personal, Indoor and Mobile Radio Communications, IEEE 19th International Symposium, Sep. 15-18, 2008, 6 pages.

* cited by examiner

*Primary Examiner* — Chi Pham
*Assistant Examiner* — Soon-Dong Hyun
(74) *Attorney, Agent, or Firm* — Slater & Matsil, L.L.P.

(57) ABSTRACT

A system and method for downlink control signal structure for multi-user MIMO is provided. A method comprises selecting a set of mobile stations (MSs) to receive substantially simultaneously transmitted transmissions, and transmitting interference control information and data to each mobile station (MS) in the set of MSs. A number of MSs in the set of MSs is less than a maximum allowable number of simultaneously scheduled MSs, and an amount of interference control information and a type of interference control information transmitted is based on the number of MSs in the set of MSs and the maximum allowable number of simultaneously scheduled MSs.

15 Claims, 12 Drawing Sheets

SYSTEM AND METHOD FOR DOWNLINK CONTROL SIGNAL STRUCTURE FOR MULTI-USER MIMO

This application claims the benefit of U.S. Provisional Application No. 61/037,975, filed on Mar. 19, 2008, entitled "DOWNLINK CONTROL SIGNAL STRUCTURE FOR MULTI-USER MIMO," which application is hereby incorporated herein by reference.

TECHNICAL FIELD

The present invention relates generally to wireless communications, and more particularly to a system and method for downlink control signal structure for multi-user multiple input, multiple output (MU-MIMO).

BACKGROUND

Multi-User MIMO (MU-MIMO) is an effective technique to increase system throughput in a wireless communications system. In general, a communications system using MU-MIMO allows the simultaneous transmission of information to multiple users from a single base station over the same frequency band. This may result in increased overall data rate and reduced user latency.

A problem often associated with implementing MU-MIMO effectively is that downlink (DL) control overhead can quickly increase with the number of users since each user needs to have information about all the other simultaneously scheduled users. The information about the other simultaneously scheduled users may be used for interference cancellation. In both a Long Term Evolution (LTE) and Universal Mobile Broadband (UMB) cellular communications systems with MU-MIMO, two solutions have been proposed: (1) limit the number of scheduled users to two and indicate the interfering vector, or (2) use a dedicated pilot. With either approach, the number of combinations between simultaneously scheduled users and their reported channel quantization grows exponentially with the number of users.

In general, there are two forms of MU-MIMO in an LTE communications network: unitary matrix based precoding and non unitary based precoding. In unitary matrix based precoding, a user (or mobile station (MS)) indicates a preferred precoder vector belonging to a known matrix. A base station (BS) then groups together multiple MSs reporting precoder vectors belonging to the same matrix. An advantage of unitary matrix based precoding is that DL control can be performed efficiently. However, MSs are grouped based on reported precoder vectors of the same matrix, which means the codebook is correspondingly small. Therefore, channels cannot be well aligned with the codebook.

In non unitary based precoding, such as zero-forcing beamforming, for example, a MS reports its channel to the BS (typically, a quantized version of the channel) using a known codebook. The BS then collects channels from all MSs and constructs a precoding matrix that is a function of the channels of the MSs and transmits the precoding matrix to the MSs. An advantage of non unitary based precoding is that the codebook may be large, therefore, channels can be well aligned with the codebook.

Therefore, there is a need for techniques that do not exhibit exponential growth in DL control structure overhead with increased MSs.

SUMMARY OF THE INVENTION

These and other problems are generally solved or circumvented, and technical advantages are generally achieved, by embodiments of a system and method for downlink control signal structure for MU-MIMO.

In accordance with an embodiment, a method for base station (BS) operation in a wireless communications system having a plurality of mobile stations (MSs) is provided. The method includes selecting a set of one or more MSs to receive substantially simultaneously transmitted transmissions, and transmitting interference control information and data to each mobile station (MS) in the set of MSs, wherein an amount of interference control information and a type of interference control information transmitted is based on the number of MSs in the set of MSs and the maximum allowable number of simultaneously scheduled MSs. The number of MSs in the set of MSs is less than or equal to a maximum allowable number of simultaneously scheduled MSs.

In accordance with another embodiment, a method for base station (BS) operation in a wireless communications system having a plurality of mobile stations (MSs) is provided. The method includes computing an indication of an operating environment of the wireless communications system, selecting a set of one or more MSs to receive substantially simultaneously transmitted transmissions, and transmitting interference control information and data to each mobile station (MS) in the set of MSs. A number of MSs in the set of MSs is less than or equal to a maximum allowable number of simultaneously scheduled MSs, and an amount of interference control information and a type of interference control information transmitted is based on the number of MSs in the set of MSs and the indication.

In accordance with another embodiment, a method for base station (BS) operation in a time division duplex wireless communications system having a mobile station (MS) is provided. The method includes transmitting a common pilot in a downlink, receiving a sounding pilot from the MS, and computing a precode matrix from the sounding pilot. The method also includes scheduling the MS, transmitting an indication of a transmission mode to the MS, and transmitting data to the MS using the transmission mode, wherein the data is precoded using the precode matrix.

In accordance with another embodiment, a method for mobile station (MS) operation in a wireless communications system having a base station (BS) is provided. The method includes receiving a transmission from the BS, performing blind compensation for phase errors in the received transmission without a phase reference, performing blind compensation for magnitude errors in the received transmission without a magnitude reference, and processing the compensated received transmission.

An advantage of an embodiment is that DL control overhead does not grow exponentially with increased MSs. In fact, the DL control overhead remains about constant with increased MSs in a wide range of operating environments.

A further advantage of an embodiment is that even in the worst operating environments, the DL control overhead matches that of existing DL control structures.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system making use of MU-MIMO with a maximum of two or four simultaneous users to increase overall communications system throughput and reduce user latency. However, the embodiments may also be applicable to MU-MIMO wireless communications systems with a different number of maximum simultaneous users, such as three, five, six, seven, eight, and so forth.

Figure 1:
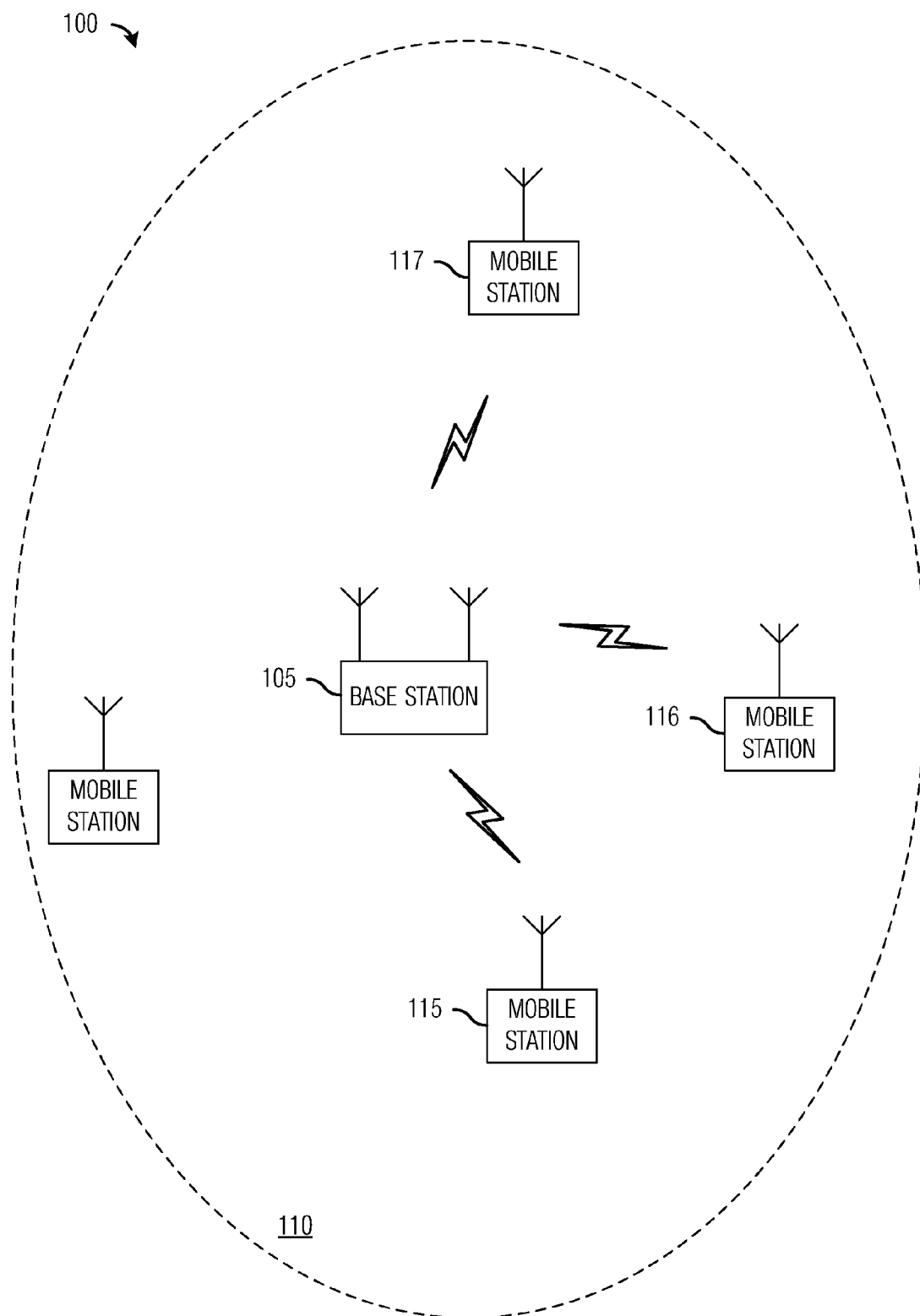
FIG. 1 is a diagram of a wireless communications system.

FIG. 1 illustrates a portion of a wireless communications system 100. Wireless communications system 100 includes a base station (BS) 105 that is responsible for controlling transmissions of mobile devices operating within its coverage area 110. Operating within the coverage area of BS 105 includes a number of mobile stations (MS), including MS 115, MS 116, and MS 117. BS 105 may include multiple transmit and/or receive antennas and may be capable of transmitting to more than one MS simultaneously, using MU-MIMO. BS 105 may be able to schedule transmissions to any number of MS operating within its coverage area as long as the number is less than or equal to a maximum number of simultaneous MSs (typically equal to a maximum number of transmit antennas on BS 105) and as long as there are transmissions to be made to the MS.

In wireless communications systems that do not have inherent built-in mechanism for supporting multiple users (MSs), such as Long Term Evolution (LTE) and Universal Mobile Broadband (UMB) cellular communications, additional processing may be required to prevent the transmissions to the multiple MSs from interfering with one another. For example, some wireless communications systems, such as those using code division multiplexing (CDM) where orthogonal codes are used to spread transmissions, have inherent built-in mechanisms for supporting multiple simultaneous MSs and their transmissions to multiple simultaneous MSs typically do not interfere with each other. If uncorrected, the interference between the transmissions may cause degraded performance, often resulting in lower performance than that attainable by simply sequentially transmitting to single MSs.

Figure 2A:
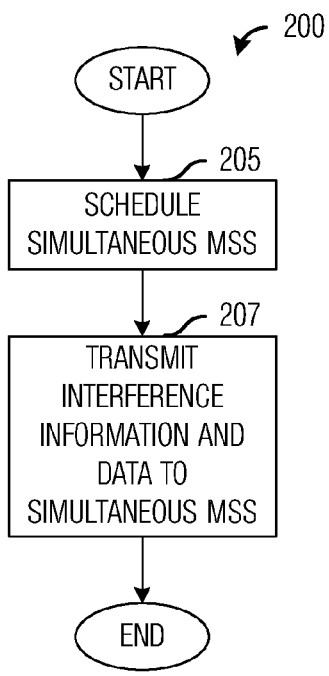
FIG. 2a is a flow diagram of base station (BS) operation in a wireless communications system with MU-MIMO using unitary matrix based precoding.

FIG. 2a illustrates a flow diagram of BS operation 200 in a wireless communications system with MU-MIMO using unitary matrix based precoding. As discussed previously, in unitary matrix based precoding, after a BS schedules simultaneous MSs (users), the BS transmits to each MS information related to the interference that it expects the MS to encounter. In general, for N simultaneous MSs, the BS will need to send to each MS, precode vectors from the remaining N−1 MSs.

BS operation 200 may begin with a BS scheduling a number of simultaneous MSs (block 205). The simultaneous MSs that the BS schedules may be selected on factors such as which MSs have requested resource allocations, which MSs have transmissions to receive, how recent was the last time a MS was scheduled, a priority level of a MS, and so forth. After scheduling the MSs, the BS may transmit interference information to each MS (block 207). The interference information sent to each MS may depend on a maximum number of simultaneous MSs, a number of MSs scheduled, and so forth.

Figure 2B:
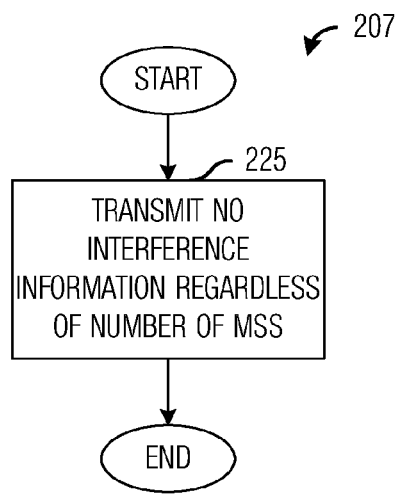
FIG. 2b is a flow diagram of transmitting interference information in a wireless communications system with MU-MIMO using unitary matrix based precoding with a maximum of two simultaneous mobile stations (MSs)

FIG. 2b illustrates a flow diagram of transmitting interference information 207 in a wireless communications system with MU-MIMO using unitary matrix based precoding with a maximum of two simultaneous MSs. According to an embodiment, with a maximum of two simultaneous MSs, the BS will transmit no interference information (i.e., precode vectors) to the scheduled MSs (block 225). Since there are a maximum of two simultaneous MSs and the precode vectors used by both MSs are known, it is not necessary to transmit the precode vectors to the MSs. A first MS of the two simultaneous MSs may simply use the precode vector of a second MS for interference cancellation, and vice versa.

Figure 2C:
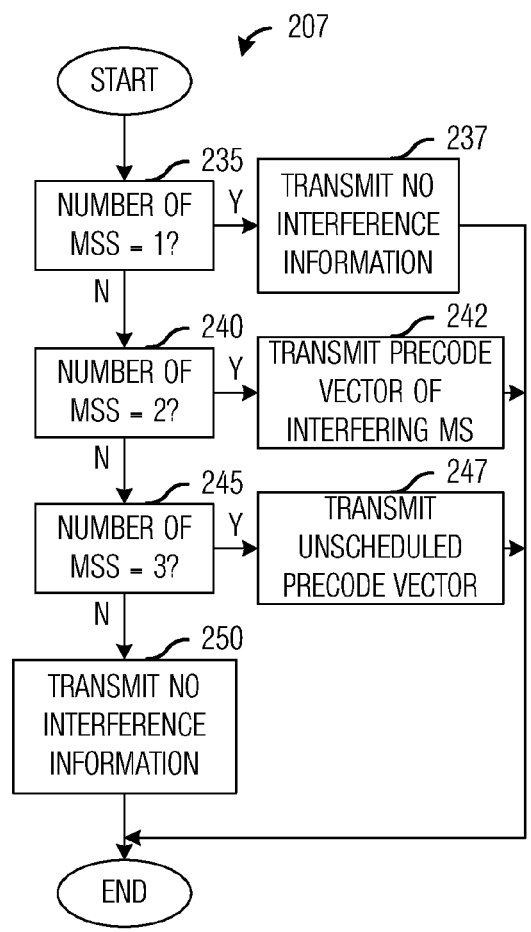
FIG. 2c is a flow diagram of transmitting interference information in a wireless communications system with MU-MIMO using unitary matrix based precoding with a maximum of four simultaneous mobile stations (MSs)

FIG. 2c illustrates a flow diagram of transmitting interference information 207 in a wireless communications system with MU-MIMO using unitary matrix based precoding with a maximum of two simultaneous MSs. The BS may transmit different interference information based on a number of simultaneous MSs that it has scheduled. If the BS has scheduled only one MS (block 235), then the BS may not need to transmit any interference information to the MS (block 237). Since there is only one MS, there will only be one transmission and there will be no correctable interference.

If the BS has scheduled two MSs (block 240), then the BS will transmit to a first MS a precode vector of a second MS, and vice versa (block 242). If the BS has scheduled three MSs (block 245), then there will be one unscheduled precode vector. The BS will transmit to each scheduled MS, the unscheduled precode vector (block 247). Finally, if the BS has scheduled all four MSs, then the BS may not need to transmit any interference information to the MSs (block 250). Since all MSs are receiving transmissions, a MS performing interference cancellation may simply utilize precode vectors of the other three MSs to perform interference cancellation.

Figure 3A:
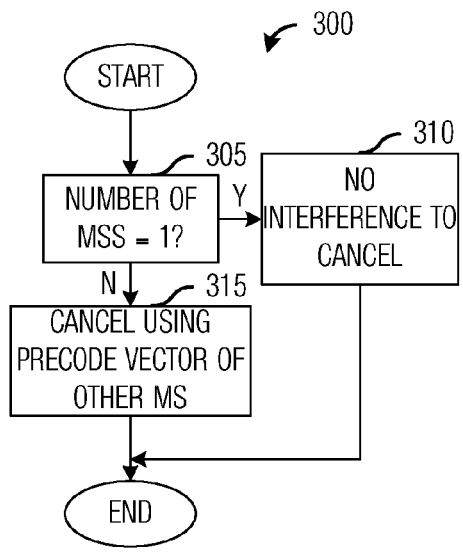
FIG. 3a is a flow diagram of MS operation in a wireless communications system with MU-MIMO using unitary matrix based precoding with a maximum of two simultaneous MSs.

FIG. 3a illustrates a flow diagram of MS operation 300 in a wireless communications system with MU-MIMO using unitary matrix based precoding with a maximum of two simultaneous MSs. In addition to transmitting interference information based on the maximum number of MSs and the scheduled number of MSs, a BS may also transmit an indication of the scheduled number of MSs. The indication of the scheduled number of MSs is also referred to as a rank. A MS may use the schedule number of MSs in determining how to perform interference cancellation. If the number of MSs is one (block 305), then there is no interference to cancel since there is only one transmission (block 310). Otherwise, the MS may perform interference cancellation using a precode vector of the other MS (block 315).

Figure 3B:
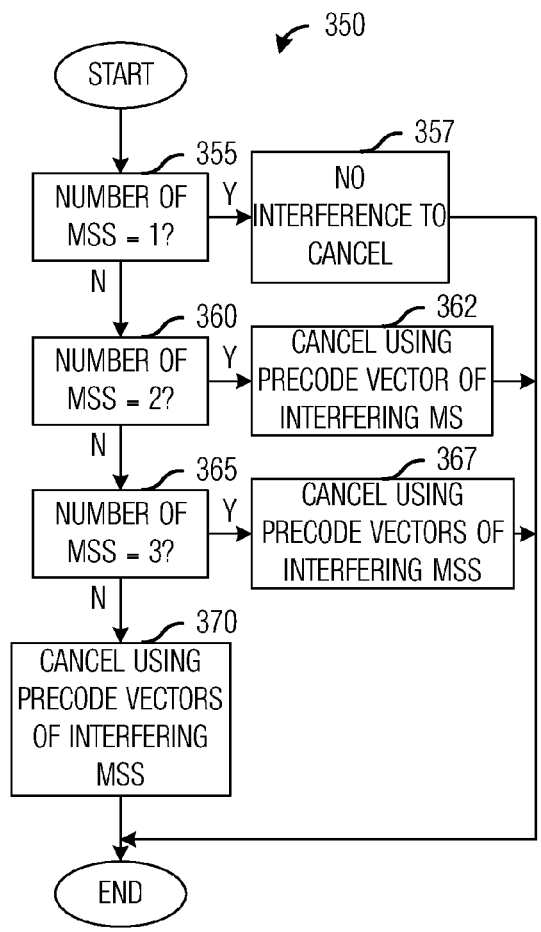
FIG. 3b is a flow diagram of MS operation in a wireless communications system with MU-MIMO using unitary matrix based precoding with a maximum of four simultaneous MSs.

FIG. 3b illustrates a flow diagram of MS operation 350 in a wireless communications system with MU-MIMO using unitary matrix based precoding with a maximum of four simultaneous MSs. If the number of MSs is one (block 355), then there is no interference to cancel since there is only one transmission (block 357). If the number of MSs is two (block 360), then the MS may perform interference cancellation using a precode vector provided by the BS (block 362). If the number of MSs is three (block 365), then MS may perform interference cancellation using precode vectors other than the precode vector provided by the BS, which is the unscheduled precode vector (block 367). Otherwise, the MS may perform interference cancellation using precode vectors of all three other MSs (block 370).

Although the discussion focuses on wireless communications systems with a maximum number of two and four simultaneously scheduled MSs, other numbers of simultaneously scheduled MSs may also be supported. For example, three, five, six, seven, eighth, and so forth, simultaneously MSs may be supported by the embodiments. Therefore, the discussion of two and four simultaneously scheduled MSs should not be construed as being limiting to either the scope or the spirit of the embodiments.

Considering a situation in a wireless communications system with MU-MIMO using non unitary based precoding where a MS with a channel to a BS of h, reports a quantized channel as an index into a codebook, resulting in an entry of the vector conjugate(w). Given that the BS will use a precoder of the form Tw in transmissions to the MS, where T represents a Hermitian matrix dependent on the other scheduled MSs. A resulting net channel that the data will see may be expressible as $h^T Tw$, where $h^T$ is the transpose of h. Usually, the MS will not know T because the control overhead for indicating T may be high. For this reason, a dedicated pilot may be used to indicate $h^T Tw$. However, in some cases no or very little additional overhead is needed.

These cases include:
1. In some cases w≈h* (where h* is the conjugate of h), then it is clear that T will be real and no additional phase information is required. Here, the MS can just assume that T=I without too much loss in performance. This will be true when:
   a. Given that a sufficiently large codebook is used to quantize the channel.
   b. The frequency response of the channel is sufficiently flat over the bandwidth so that $h_k$≈w for which w is reported on the k-th tone.
   c. The frequency response of the channel is not flat but the BS' antennas have a high correlation so that the k-th tone can be adequately represented by $h_k$≈$α_k$ w and $h^T Tw$≈$α_k w^H Tw$, where $w^H$ is the Hermitian transpose of w, $α_k$ is an arbitrary known scalar.
2. Given that only two MSs are scheduled, the BS only needs to report an index of the reported precoding vector of the other MS to a first MS. In this case the first MS can reconstruct Tw perfectly if it knows the function that is used to generate T.

Since it is ultimately up to a scheduler of the BS to decide when and how many MSs to schedule, the BS may decide to schedule MSs where the criteria listed above do not apply. In this situation, a dedicated pilot would be needed to indicate the phase reference. A problem then arises on how to effectively switch on/off the dedicated pilot. A solution may be to use D, a 1-bit field in transmissions from the BS to the MSs, to indicate three possible modes in addition to indicating the rank. Field D could possibly be a function of the norm(Tw). Since Tw is a column vector, the norm(Tw) will provide a value equal to a square root of a sum of the squares of the elements of Tw.

Figure 4A:
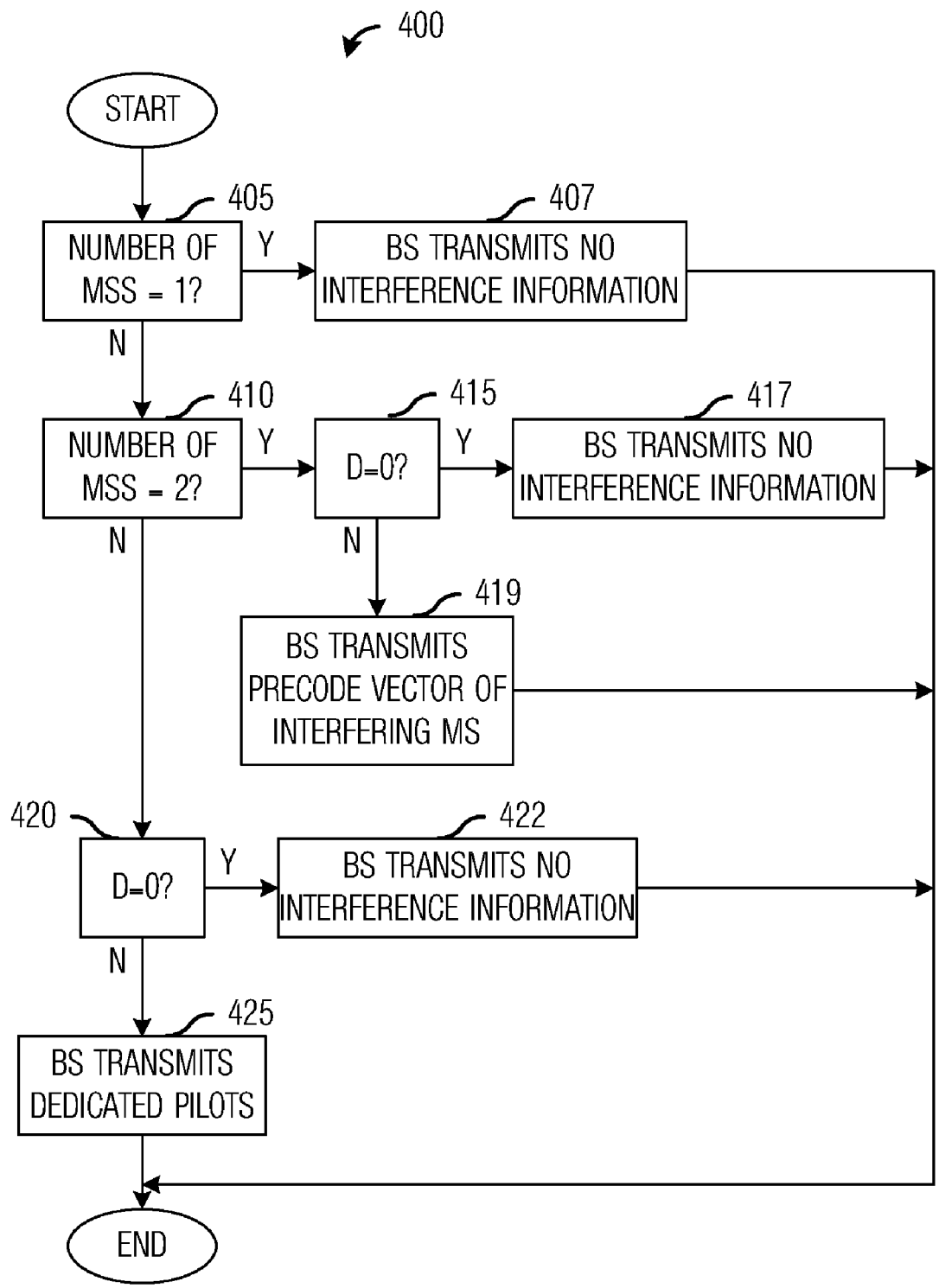
FIG. 4a is a flow diagram of BS operation in a wireless communications system with MU-MIMO using non unitary based precoding.

FIG. 4a illustrates a flow diagram of BS operation 400 in a wireless communications system with MU-MIMO using non unitary based precoding. If the number of simultaneously scheduled MSs is equal to one (block 405), then the BS may transmit no interference information to the MS (block 407).

If the number of simultaneously scheduled MSs is equal to two (block 410), then the BS may set D to a value based on the above listed conditions. If D is equal to zero (0) (block 415), then the BS transmits no interference information to the MS (block 417). If D is equal to one (1) (block 415), then the BS transmits a precode vector of interfering MS (block 419).

If the number of simultaneously scheduled MSs is greater than two (block 410), then the BS may set D to a value based on the above listed conditions. If D is equal to zero (0) (block 420), then the BS transmits no interference information to the MS (block 422). If D is equal to one (1) (block 420), then the BS transmits dedicated pilots (block 425).

Figure 4B:
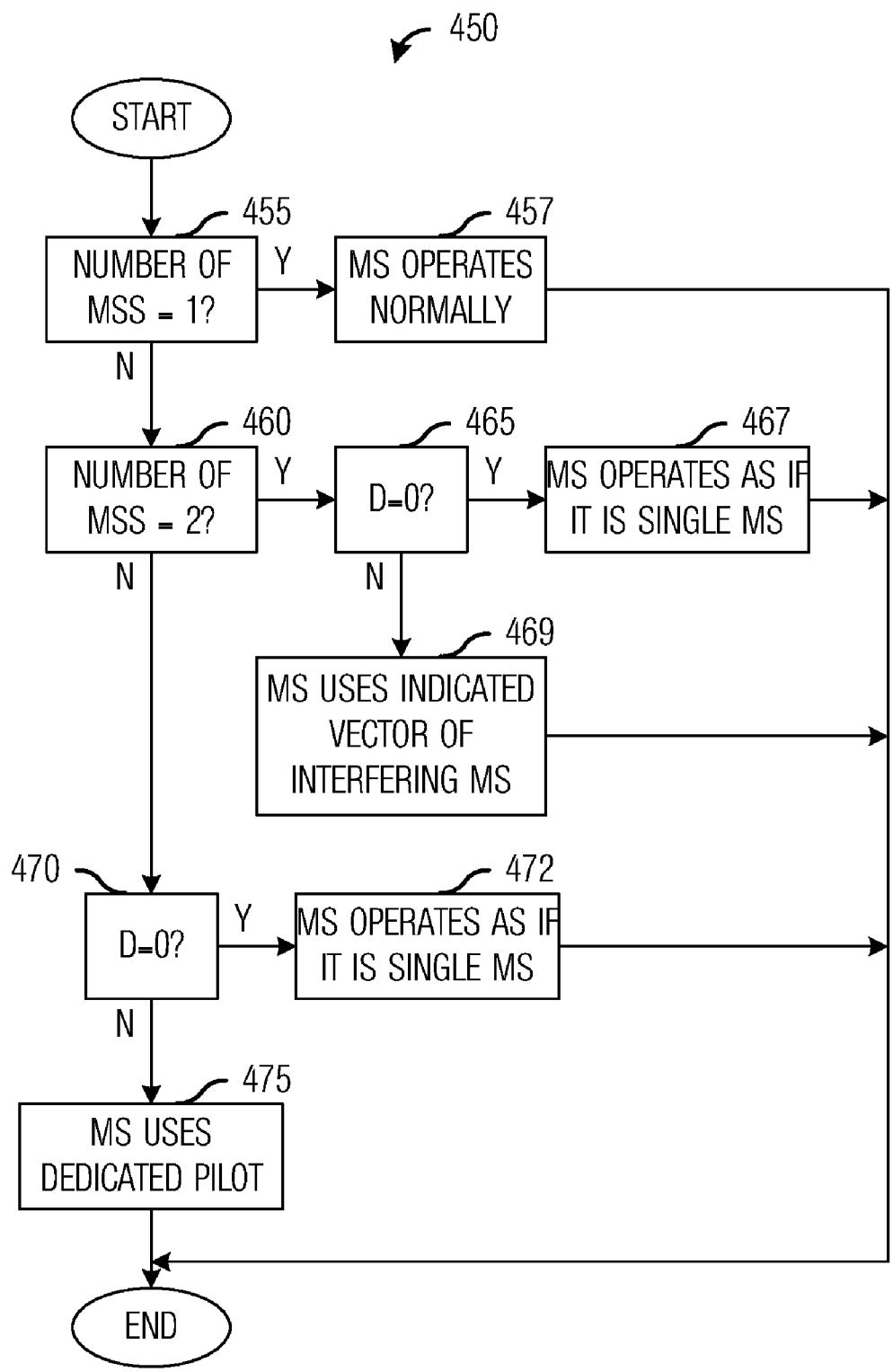
FIG. 4b is a flow diagram of MS operation in a wireless communications system with MU-MIMO using non unitary based precoding.

FIG. 4b illustrates a flow diagram of MS operation 450 in a wireless communications system with MU-MIMO using non unitary based precoding. If the number of simultaneously scheduled MSs is equal to one (block 455), then the MS may not need to perform any interference cancellation since it is a single recipient of the BS' transmission (block 457).

If the number of simultaneously scheduled MSs is equal to two (block 460), and if D is equal to zero (0) (block 465), then the MS may operate as if it does not need to perform any interference cancellation since it is a single recipient of the BS' transmission, although it is not (block 467). If D is equal to one (1) (block 465), then the MS makes use of a precode vector provided by the BS to perform interference cancellation (block 469).

If the number of simultaneously scheduled MSs is greater than two (block 460), and if D is equal to zero (0) (block 470), then the MS may operate as if it does not need to perform any interference cancellation since it is a single recipient of the BS' transmission, although it is not (block 472). If D is equal to one (1) (block 420), then the MS uses the dedicated pilot provided by the BS to perform phase adjustment and perform interference cancellation (block 475).

An additional technique that may be utilized to help reduce DL control overhead may be to replace information transmitted from the BS to the MSs with statistical information that may be independently measured at both the BS and the MSs. The statistical information may then be used to infer operation of the wireless communications system. For example, frequency selectivity and antenna correlation may be measured at both the BS and the MSs and then used to determine the operation of the wireless communications system and eliminate the transmission of D.

Figure 5A:
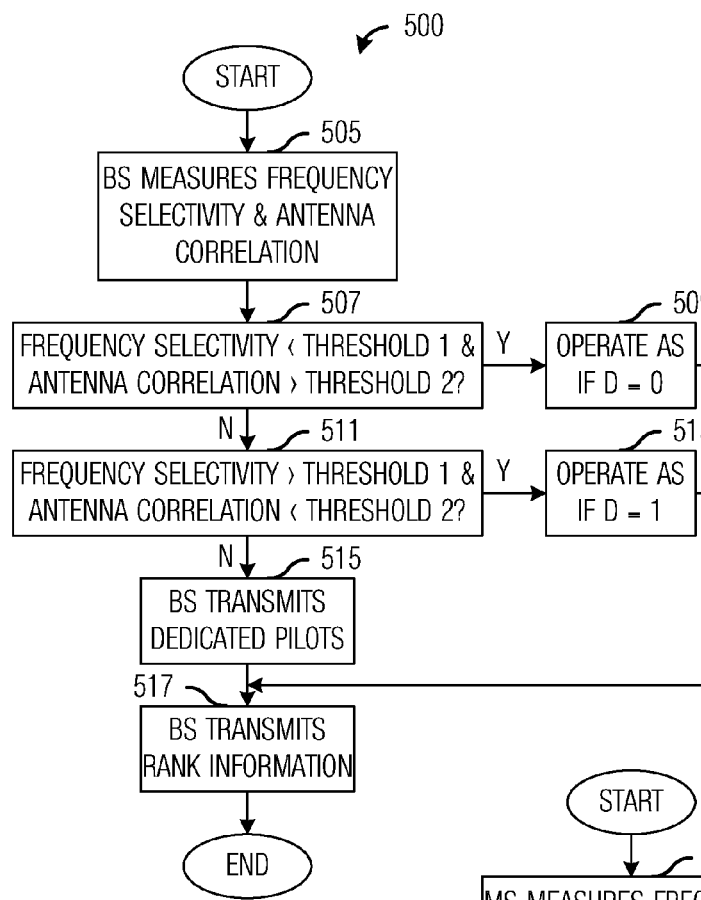
FIG. 5a is a flow diagram of BS operation in a wireless communications system with MU-MIMO using non unitary based precoding and statistical information measured at the BS.

FIG. 5a illustrates a flow diagram of BS operation 500 in a wireless communications system with MU-MIMO using non unitary based precoding and statistical information measured at the BS. BS operation 500 may begin with the BS measuring frequency selectivity and antenna correlation (block 505). The frequency selectivity and antenna correlation measurements may be statistical measurements and may be taken over time or instantaneously. The BS may then compare the frequency selectivity against a first threshold and the antenna correlation against a second threshold (block 507). The first threshold and the second threshold may be pre-specified, fixed, or indicated on call initiation. If the frequency selectivity is less than the first threshold and the antenna correlation is greater than the second threshold (block 507), then the BS may operate as if operating conditions are such that would result in D being set to zero (block 509).

Else if the frequency selectivity is greater than the first threshold and the antenna correlation is less than the second threshold (block 511), then the BS may operate as if operating conditions are such that would result in D being set to one (block 513). If neither comparison is true, then the BS may transmit dedicated pilots (block 515). The BS may complete BS operations 500 by transmitting rank information (block 517).

Figure 5B:
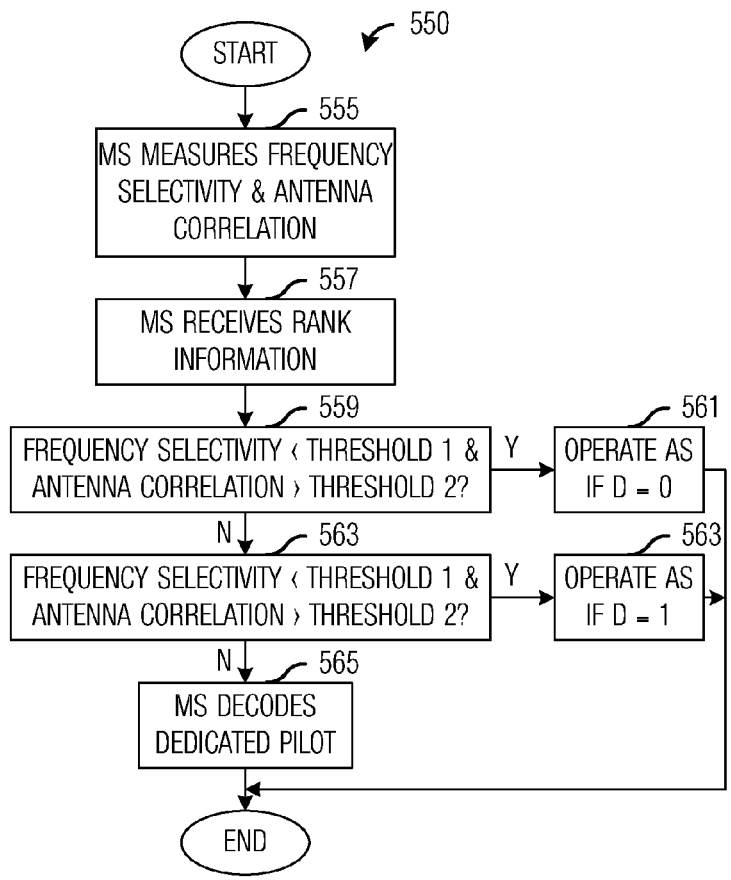
FIG. 5b is a flow diagram of MS operation in a wireless communications system with MU-MIMO using non unitary based precoding and statistical information measured at the MS.

FIG. 5b illustrates a flow diagram of MS operation 550 in a wireless communications system with MU-MIMO using non unitary based precoding and statistical information measured at the MS. MS operation 550 may begin with the MS measuring frequency selectivity and antenna correlation (block 555). The frequency selectivity and antenna correlation measurements may be statistical measurements and may be taken over time or instantaneously. The MS may then receive rank information transmitted by the BS (block 557). The MS may then compare the frequency selectivity against a first threshold and the antenna correlation against a second threshold (block 559). The first threshold and the second threshold may be pre-specified, fixed, or indicated on call initiation. If the frequency selectivity is less than the first threshold and the antenna correlation is greater than the second threshold (block 559), then the MS may operate as if operating conditions are such that would result in D being set to zero (block 561).

Else if the frequency selectivity is greater than the first threshold and the antenna correlation is less than the second threshold (block 563), then the MS may operate as if operating conditions are such that would result in D being set to one (block 565). If neither comparison is true, then the MS may decode dedicated pilot transmitted by the BS (block 565). The MS operations 550 may then terminate.

In an alternative embodiment, it may be possible to use independently measured statistical information (for example, frequency selectivity and antenna correlation), measured at the BS and the MSs to eliminate the transmission of both D and rank information. Based on the measurements at both the BS and the MSs, the BS and the MSs would know that effectively D=0 when the frequency selectivity is below a first threshold and when the antenna correlation is above a second threshold. Alternatively, it will be known D=1 when the frequency selectivity is above the first threshold and when the antenna correlation is below the second threshold. Without the rank information, either the dedicated pilot or a precode vector of the interfering MS will always be used. This may mean that nothing needs to be signaled on the DL. The first threshold and the second threshold may be pre-specified, fixed, or indicated on call initiation.

Figure 6:
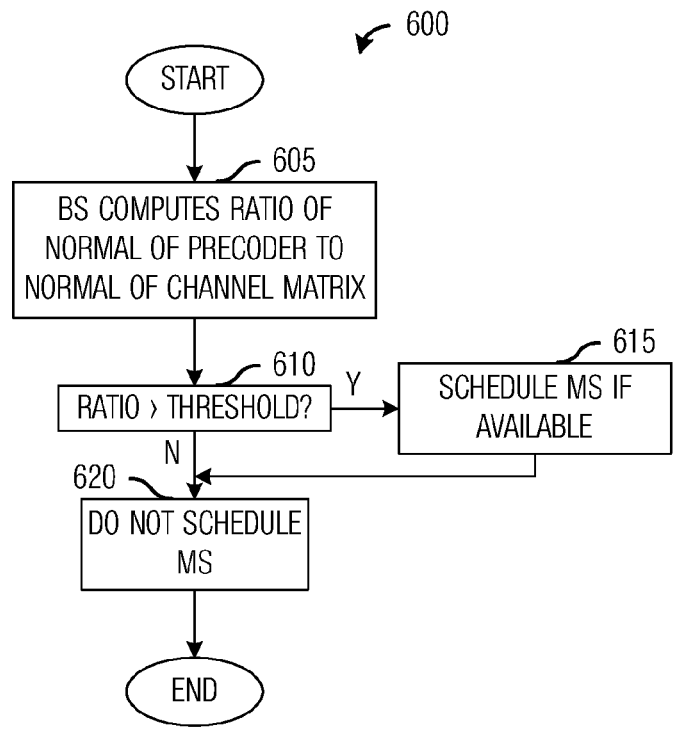
FIG. 6 is a flow diagram of BS operation in a wireless communications system with MU-MIMO using non unitary based precoding.

In another alternative embodiment, the BS may perform rank adaptation (determining the number of simultaneously scheduled MSs) by comparing the normals of the precoder and channel matrix for an MS with a threshold. FIG. 6 illustrates a flow diagram of BS operation 600 in a wireless communications system with MU-MIMO using non unitary based precoding. The BS may compute a ratio of the normals of the precoder and the channel matrix for a MS (block 605). Since both Tw and w are column vectors, the norm of a column vector will return the square root of a sum of the squares of the elements of the column vector. The ratio may provide an indicator of relative power lost at a first MS due to zero-forcing, null-steering, or pre-cancelling the signal of a second MS. If the ratio is greater than the threshold (block 610), then the BS may schedule the MS for transmission (block 615). If the ratio is not greater than the threshold, then the BS may not schedule the MS for transmission (block 620).

According to LTE technical standards, a MS could be required to demodulate higher order modulation, such as Quadrature Amplitude Modulation-16 (QAM16) or Quadrature Amplitude Modulation-64 (QAM64), for example, without a phase reference or a magnitude reference.

The MS can correct for a phase reference given that a received data signal is not rotated more than 90 degrees away from the given reference signal combined with the assumed precoding (which will be different from the actual precoding). In QAM4 modulation, the following identity always holds arctan $$\left\{ \left| \frac{\Re\{s_k\}}{\Im\{s_k\}} \right| \right\} = \frac{\pi}{4},$$

where $s_k$ is any symbol from a QAM4 constellation. However, the identity mostly holds also for QAM16 and QAM64 modulations. To be precise, in QAM16, the identity holds for 50% of the symbols where the other 50% would be either $$\frac{\pi}{4} \pm \frac{\pi}{6.78}.$$

In QAM64 the identity is only true for 25% of the symbols where a maximum deviation can be $$\frac{\pi}{4} \pm \frac{\pi}{4.9}.$$

Therefore it is possible to always normalize the received signal so that the identity $$\text{Mean}\left\{\arctan\left\{\left|\frac{\Re\{\hat{s}_k\}}{\Im\{\hat{s}_k\}}\right|\right\}\right\} = \frac{\pi}{4}$$

holds, where $\hat{s}_k$ is the k-th demodulated symbol before the maximum likelihood detector.

The MS can correct for a magnitude reference given the knowledge that any symbol from any QAM constellation will, on average, have unity power, and that an instantaneous symbol will have a uniform distribution across all possible symbols in the constellation set. Then, given that the data to power ratio will remain constant for as long a period as which the MS can reliably average, and given that the MS can estimate the channel reliably (up to some unknown constant), the mobile can apply a technique based on a method of iterated expectation. Here assume a k-th received symbol is expressible as $r_k = h_k s_k p$, where $s_k$ is the unknown transmitted symbol and $h_k$ is the known channel and p is the unknown arbitrary real magnitude scaling. Then the average received power can be expressed as $$E[|r_k|^2] = E[|h_k|^2|s_k|^2 p^2] = E[|h_k|^2]E[|s_k|^2]E[p^2] = E[|h_k|^2]E[p^2]$$

due to the independence of the random variables. Given that $h_k$ is known, and that p can be estimated as $$\hat{p} = \sqrt{\frac{E[|r_k|^2]}{E[|h_k|^2]}}.$$

The scaling can then be applied to perform a maximum likelihood symbol detection as $$\hat{s} = \frac{\min}{s_c}\{|r_k - h_k \hat{p} s_c|^2\}$$

where $s_c$ represents a search over all the possible symbols in the constellation.

Figure 7:
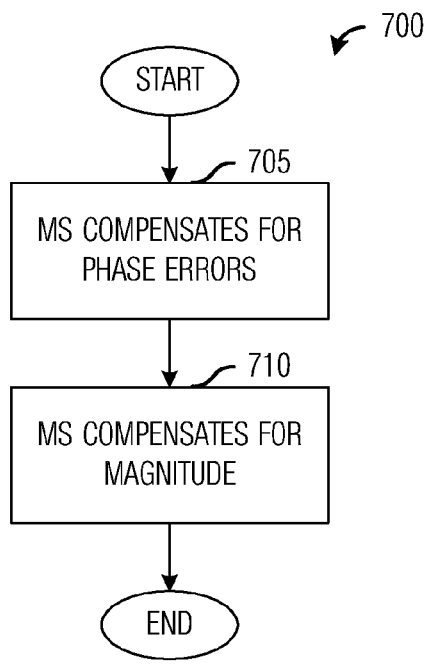
FIG. 7 is a flow diagram for MS operation.

FIG. 7 illustrates a flow diagram for MS operation 700. MS operation 700 includes blind compensation for phase errors less than 45 degrees relative to an implied precoded channel (block 705) and compensation for an unknown data to pilot power ratio (block 710) after receiving a transmission. Although shown as occurring sequentially, the compensations may occur in parallel or in any order (i.e., phase compensation prior to magnitude compensation or magnitude compensation prior to phase compensation).

Any transmitted symbol with any higher ordered QAM modulation may be detected without a dedicated pilot given that the scheduler of the BS will pair up MSs on a sufficiently slow rate so that any magnitude and/or phase corrections can be performed by the MSs.

In a time division duplexing (TDD) wireless communications system with MU-MIMO with both DL common pilots and uplink (UL) sounding pilots, the channel is completely known to both the BS and the MS. When both the BS and the MS know a beamforming mode, such as maximum ratio transmission (MRT) (or any other mode such as singular value decomposition (SVD) precoding or eigenbeamforming), is occurring, there may be no need for a dedicated pilot since both the MS and the BS knows, for example, in MRT, that the conjugate of the channel is used as the transmit vector. In this situation, the only additional DL signaling required from the BS is for the BS to inform the MS the mode that the BS will be transmitting the data.

Figure 8:
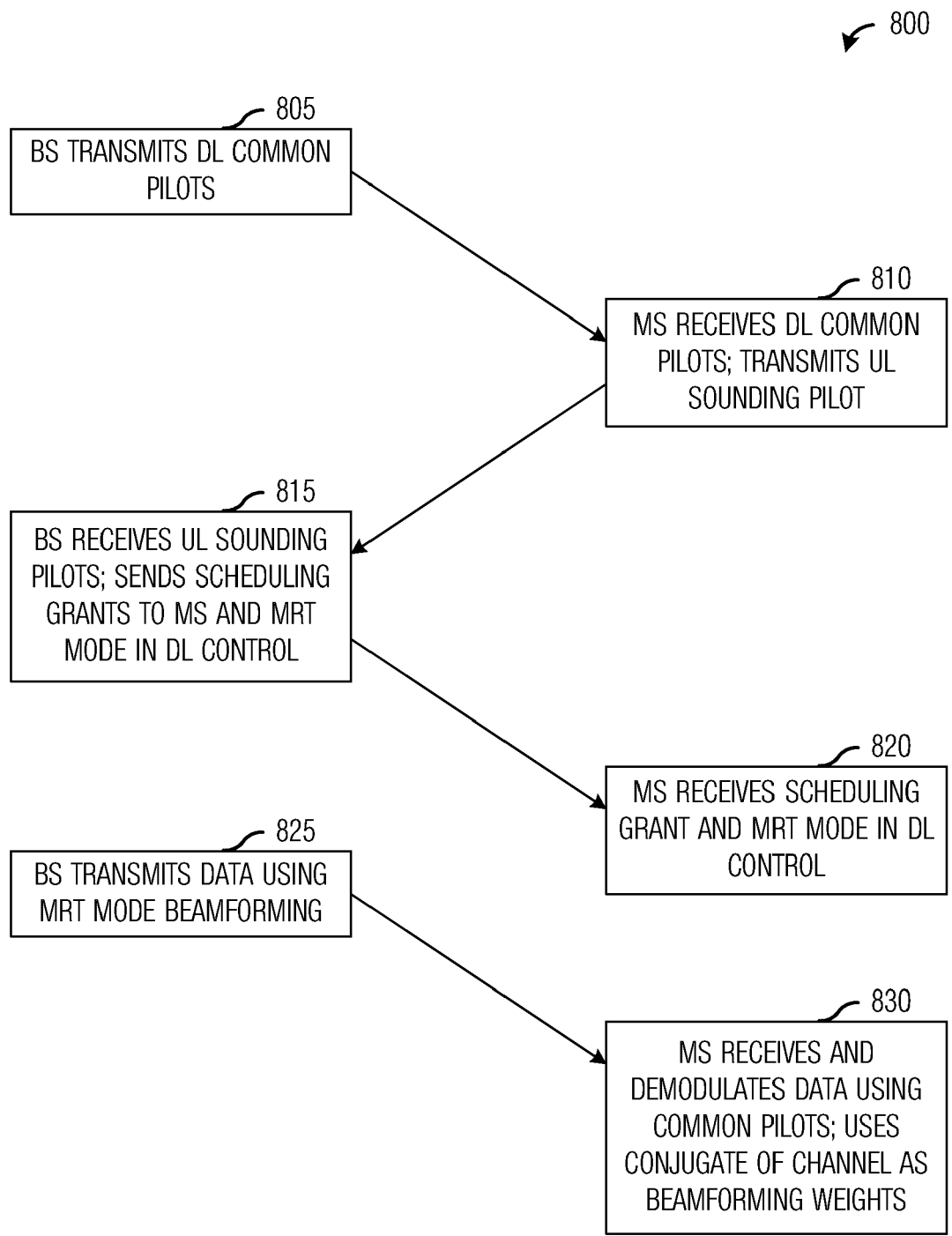
FIG. 8 is a diagram of signal flow between a BS and a MS of a TDD wireless communications system with MU-MIMO.

FIG. 8 illustrates a signal flow 800 between a BS and a MS of a TDD wireless communications system with MU-MIMO. As discussed previously, in a TDD wireless communications system, it is possible to completely know the channel at both the BS and the MS. Therefore, beamforming may be utilized without dedicated pilots. A connection may begin with the BS transmitting DL common pilots (i.e., pilots for all MSs communicating with the BS) (block 805). The MS may receive the DL common pilot and transmit back to the BS an UL sounding pilot (block 810). From the DL common pilot and the UL sounding pilot, the BS and the MS may be able to determine the channel.

The BS receives the UL sounding pilot and in response, sends scheduling grants to the MS and MRT mode indication in DL control (block 815). The MS receives the scheduling grants and MRT mode indication in the DL control (block 820). It may be possible for the BS to initiate the transmission of data using MRT beamforming to the MS even before the MS receives the scheduling grants and MRT mode indication in the DL control (block 825). The MS receives and modulates the transmitted data. The MS demodulates the data using the common pilots and uses a conjugate of the channel as beamforming weights (block 830).

Figure 9:
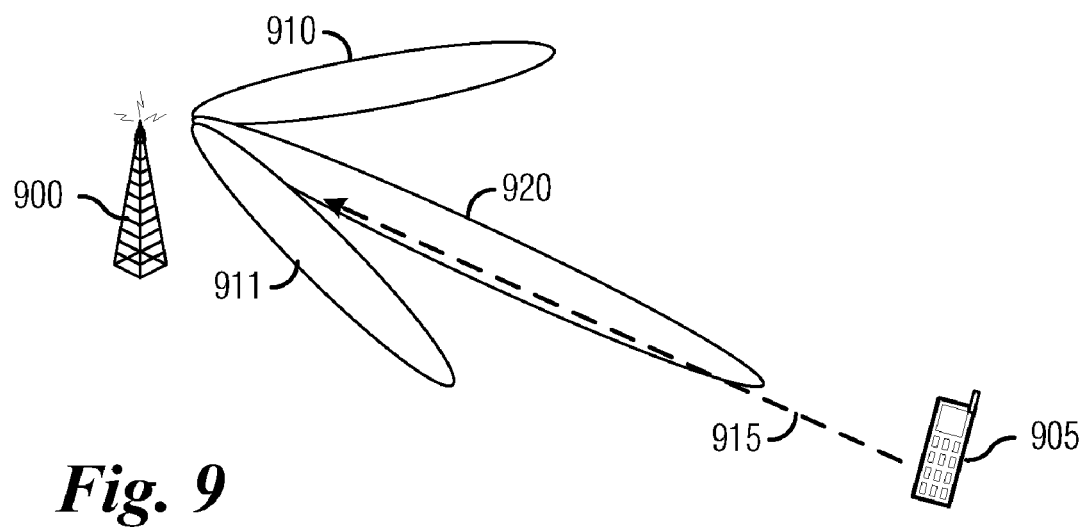
FIG. 9 is a diagram of a wireless communications system including a BS and a MS.

FIG. 9 illustrates a wireless communications system including a BS 900 and a MS 905. BS 900 transmits a number of common pilots, such as common pilot 910 and common pilot 911. In response to receiving the common pilots, MS 905 transmits an UL sounding pilot 915. BS 900 then transmits data on a DL using MRT beamforming (MRT beam 920 shown in FIG. 9). MS 905 knows to use conjugate of channel as beamforming vector.

Simulation studies of the performance of wireless communications system with MU-MIMO were performed to evaluate the impact of dedicated pilots on the overall performance of the wireless communications system. Simulation studies include a flat fading channel and a very frequency selective channel. Minimum mean squared error (MMSE) beam forming was simulated with the T matrix calculated as expressed:

$$Rxx = \text{sum}\{i=1\ldots 2\} w_i w_i^H + \text{sigma} * I$$

$$T = \text{inverse}(Rxx).$$

Where sigma is the noise variance, I is the size of the transmission identity matrix, and $w_i$ is the reported precoding vector of the i-th scheduled MS.

A summary of simulation parameters are as follows:

| | |
|---|---|
| Number of (Tx, Rx) | (4, 1) |
| Channel Models | TU, RA |
| FFT size | 512 |
| Mobile Speed | 3 km/h |
| Used Subcarriers | 12/24/60 |
| Spatial Correlation | 85% |
| Information Frame (Code Block & Scheduling) Size | 1000 bits |
| Modulation | QAM4, QAM16 |
| Number of MSs in Cell to choose $2^{nd}$ scheduled MS from | 10 |
| Subband size over which MS reports preferred precoder vector on UL, and the BS schedules 1 or 2 MSs | 12/24/60 subcarriers |
| Channel Coding | Soft Input Conv Code (1/3) |
| Rank Adaptation | Yes |
| Rank adaptation threshold (t3 in Equation 1) (optimum value obtained by inspection, the first element of T(0,0) = 1, and the norm(w) = 1) | 0.07 |
| Vector CodeBook | 6 bit Grassmanian codebook obtained from http://cobweb.ecn.purdue.edu/~djlove/grass.html |
| Formula for calculation of T | Defined in Equation 2. |
| HARQ | No |
| Max Transmit Rank | 2 |
| Indicate Rank on Downlink | No. The MS automatically normalizes the received power due to the unknown power fluctuation due to rank adaptation. |

Figure 10A:
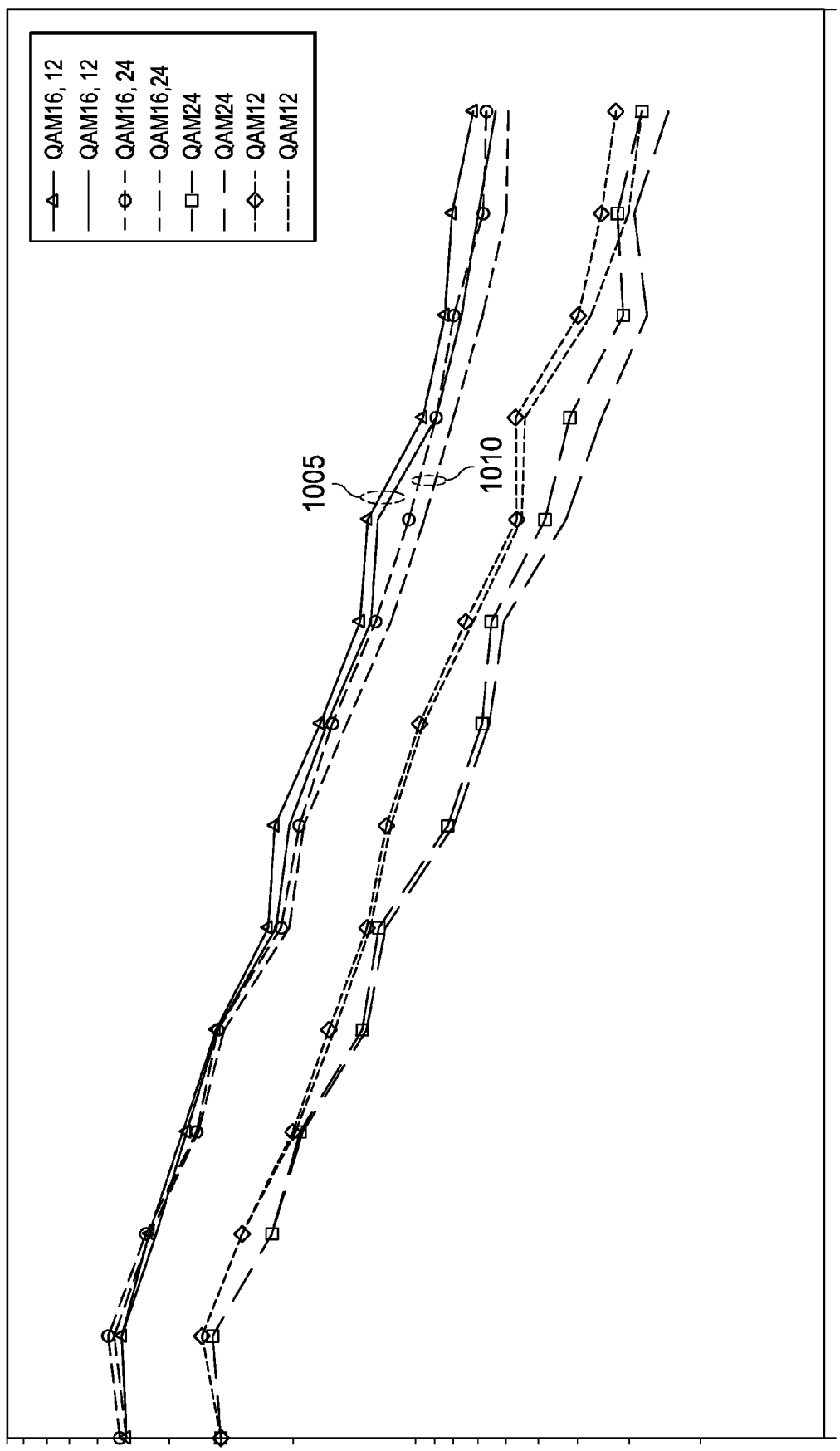
FIGS. 10a and 10b are data plots of frame error rate versus a ratio of energy per bit to spectral noise density for a flat fading channel (FIG. 10a) and a very frequency selective channel (FIG. 10b)
Figure 10B:
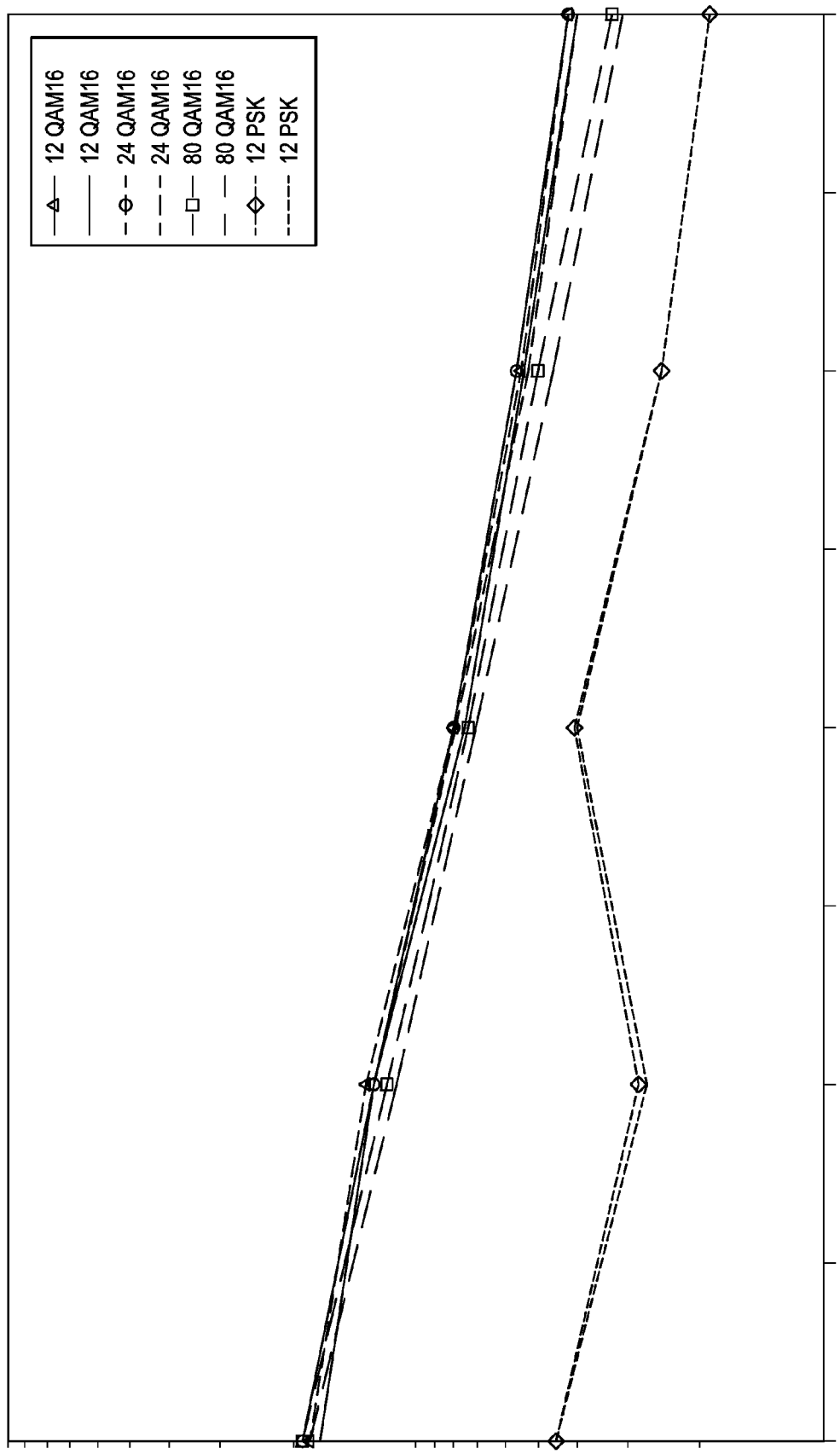

FIGS. 10a and 10b illustrate data plots of Frame Error Rate (FER) versus a ratio of energy per bit to spectral noise density for a flat fading channel (FIG. 10a) and a very frequency selective channel (FIG. 10b). Traces with a cross-hatch indicate the simulated performance of a wireless communications system without dedicated pilots and traces without a cross-hatch indicate the simulated performance of a wireless communications system with dedicated pilots. Clearly, the difference in simulated performance with and without dedicated pilot channels is very small. For example, in FIG. 10a, group 1005 highlight traces for QAM16 and 12 subcarriers, and group 1010 highlight traces for QAM16 and 24 subcarriers.

Figure 10C:
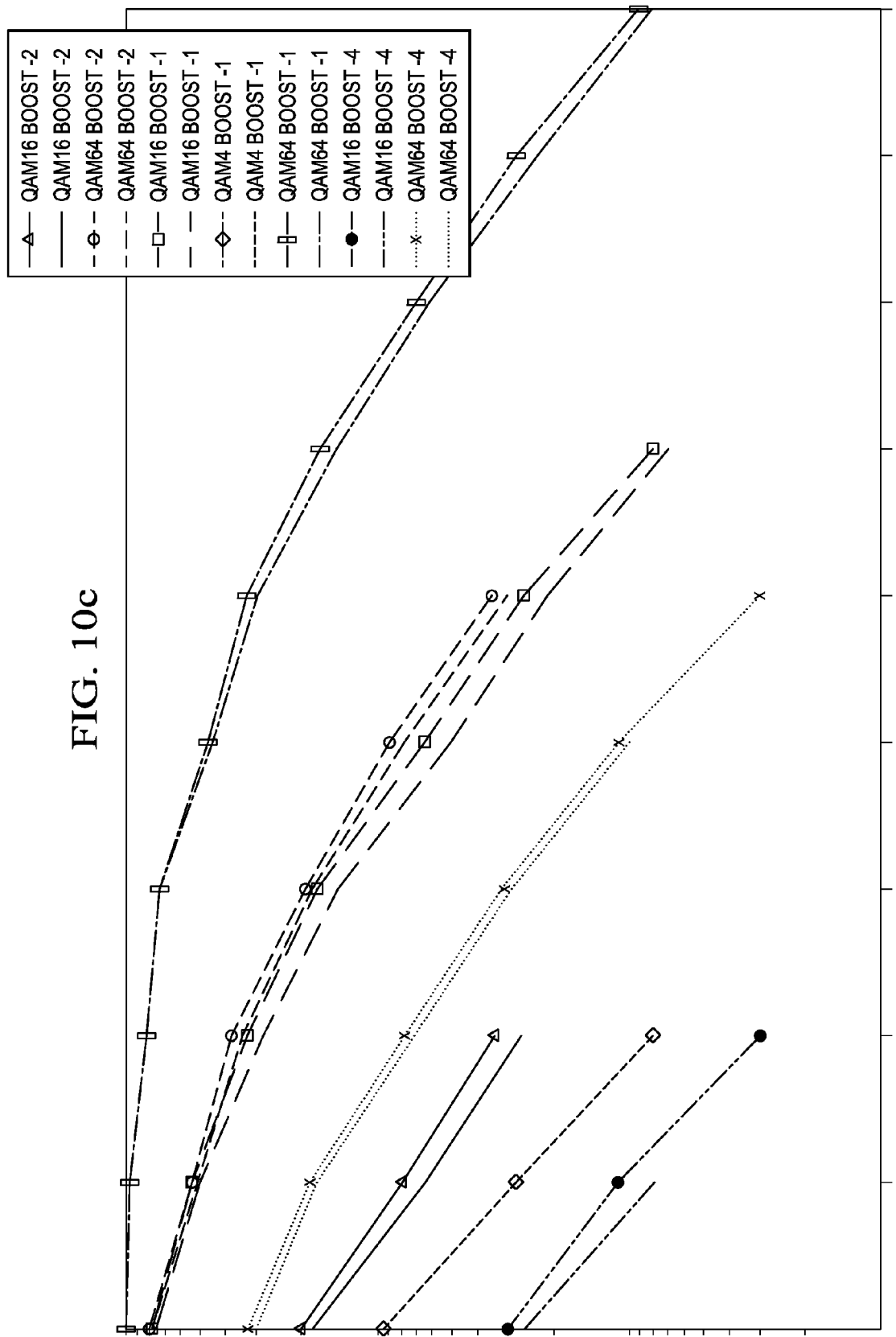
FIG. 10c is a data plot of frame error rate versus a ratio of energy per bit to spectral noise density comparing the performance impact of blind compensation of received signal magnitude.

FIG. 10c illustrates a data plot of FER versus a ratio of energy per bit to spectral noise density. The simulation study compares the impact of the lack of a magnitude reference at a MS while the data has been boosted. Again, the simulation study shows that there is no significant impact on performance when the MS has to blindly compensate for the magnitude.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for base station (BS) operation in a wireless communications system having a plurality of mobile stations (MSs), the method comprising:

selecting a set of one or more MSs to receive substantially simultaneously transmitted transmissions, wherein a number of MSs in the set of MSs is less than or equal to a maximum allowable number of simultaneously scheduled MSs; and transmitting interference control information and data to each mobile station (MS) in the set of MSs, wherein an amount of interference control information and a type of interference control information transmitted is based on the number of MSs in the set of MSs and the maximum allowable number of simultaneously scheduled MSs.

2. The method of claim 1, wherein a number of MSs in the plurality of MSs is equal to the maximum allowable number of simultaneously scheduled MSs.

3. The method of claim 1, the selecting a set of MSs comprises for each MS in the plurality of MSs:

computing a ratio of a normal of a precoder matrix for all MSs in the plurality of MSs other than the MS to a normal of a codeword used for the MS; and adding the MS to the set of MSs if the ratio is greater than a threshold.

4. The method of claim 1, wherein the maximum allowable number of simultaneously scheduled MSs is equal to two (2), and wherein the transmitting interference control information comprises transmitting no interference control information regardless of the number of MSs in the set of MSs.

5. The method of claim 1, wherein the maximum allowable number of simultaneously scheduled MSs is equal to four (4), wherein there are four precode vectors with each MS in the set of MSs being assigned a precode vector, and wherein the transmitting interference control information comprises for a first MS in the set of MSs,
transmitting no interference control information to the first MS in response to determining that the number of MSs in the set of MSs is equal to one (1);
transmitting a precode vector assigned to a second MS to the first MS in response to determining that the number of MSs in the set of MSs is equal to two (2), wherein the second MS is one of two MSs in the set of MSs;
transmitting an unassigned precode vector to the first MS in response to determining that the number of MSs in the set of MSs is equal to three (3), wherein the third MS is a MS in the plurality of MSs but not in the set of MSs; or
transmitting no interference control information to the first MS in response to determining that the number of MSs in the set of MSs is equal to four (4).

6. A method for base station (BS) operation in a wireless communications system having a plurality of mobile stations (MSs), the method comprising:
computing an indication of an operating environment of the wireless communications system;
selecting a set of one or more MSs to receive substantially simultaneously transmitted transmissions, wherein a number of MSs in the set of MSs is less than or equal to a maximum allowable number of simultaneously scheduled MSs; and
transmitting interference control information and data to each mobile station (MS) in the set of MSs, wherein an amount of interference control information and a type of interference control information transmitted is based on the number of MSs in the set of MSs and the indication.

7. The method of claim 6, wherein the computing an indication is based on a normal of a precoder matrix for all MSs in the set of MSs.

8. The method of claim 6, wherein the computing an indication comprises:
measuring statistical information of the operating environment; and
computing the indication based on the statistical information.

9. The method of claim 8, wherein the statistical information comprises frequency selectivity and antenna correlation.

10. The method of claim 9, wherein the indication is a two-valued function, and wherein the computing the indication based on the statistical information comprises:
comparing the frequency selectivity to a first threshold;
comparing the antenna correlation to a second threshold; and
setting the indication to indicate that the operating environment meets a specified criteria in response to determining that the frequency selectivity is less than the first threshold and that the antenna correlation is greater than the second threshold.

11. The method of claim 10, wherein the computing the indication based on the statistical information further comprises setting the indication to indicate that the operating environment does not meet a specified criteria in response to determining that the frequency selectivity is greater than the first threshold and that the antenna correlation is less than the second threshold.

12. The method of claim 6, wherein the indication is a two-valued function, and wherein the transmitting interference control information comprises for each MS in the set of MSs,
transmitting no interference control information to the MS in response to determining that the number of MSs in the set of MSs is equal to one (1);
transmitting no interference control information to the MS in response to determining that the number of MSs in the set of MSs is equal to two (2) and that the indication indicates that the operating environment meets a specified criteria;
transmitting a precode vector of a first other MS to the MS in response to determining that the number of MSs in the set of MSs is equal to two (2) and that the indication indicates that the operating environment does not meet the specified criteria, wherein the first other MS is one of two MSs in the set of MSs;
transmitting no interference control information to the MS in response to determining that the number of MSs in the set of MSs is greater than two (2) and that the indication indicates that the operating environment meets a specified criteria; or
transmitting a dedicated pilot to the MS in response to determining that the number of MSs in the set of MSs is greater than two (2) and that the indication indicates that the operating environment does not meets a specified criteria.

13. The method of claim 6, wherein the transmitting interference control information comprises transmitting the indication and the number of MSs in the set of MSs along with the interference control information and the data.

14. The method of claim 6, wherein the transmitting interference control information comprises transmitting the number of MSs in the set of MSs along with the interference control information and the data.

15. The method of claim 6, wherein the transmitting interference control information comprises transmitting only the interference control information and the data.

* * * * *